United States Patent
Sugaya et al.

(10) Patent No.: US 12,304,716 B2
(45) Date of Patent: May 20, 2025

(54) COVER MEMBER AND MEMBER SUPPLY ASSEMBLY INCLUDING SAME

(71) Applicant: NITTO DENKO CORPORATION, Osaka (JP)

(72) Inventors: Yosuke Sugaya, Osaka (JP); Hiroki Kigami, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 424 days.

(21) Appl. No.: 17/632,676

(22) PCT Filed: Aug. 6, 2020

(86) PCT No.: PCT/JP2020/030270
§ 371 (c)(1),
(2) Date: Jul. 18, 2022

(87) PCT Pub. No.: WO2021/033571
PCT Pub. Date: Feb. 25, 2021

(65) Prior Publication Data
US 2022/0348393 A1    Nov. 3, 2022

(30) Foreign Application Priority Data
Aug. 16, 2019    (JP) .................................. 2019-149386

(51) Int. Cl.
*B65D 77/20*    (2006.01)
*B32B 3/26*    (2006.01)
(Continued)

(52) U.S. Cl.
CPC .......... *B65D 77/2024* (2013.01); *B32B 3/266* (2013.01); *B32B 5/022* (2013.01);
(Continued)

(58) Field of Classification Search
CPC ........... B32B 3/266; B32B 5/022; B32B 5/18; B32B 7/06; B32B 7/14; B32B 27/065;
(Continued)

(56) References Cited

U.S. PATENT DOCUMENTS

2010/0206660 A1    8/2010  Horie et al.
2010/0300915 A1   12/2010  Kakura et al.
(Continued)

FOREIGN PATENT DOCUMENTS

CN    101918289    12/2010
CN    107001871     8/2017
(Continued)

OTHER PUBLICATIONS

English machine translation for JP2009044731. (Year: 2009).*
(Continued)

*Primary Examiner* — Michael C Miggins
(74) *Attorney, Agent, or Firm* — GREENBLUM & BERNSTEIN, P.L.C.

(57) ABSTRACT

A cover member of the present invention is a cover member to be placed on a face of an object to prevent passage of a foreign matter through an opening of the face, the cover member including: a protective membrane having a shape configured to cover the opening when the cover member is placed on the face; and a first substrate layer joined to one of principal surfaces of the protective membrane. The first substrate layer has a laminated structure including at least two substrate films, and is positioned between the protective membrane and the face when the cover member is placed on the face. The at least two substrate films include a non-foam film and a foam film. The cover member of the present invention is suitable for improving the peelability from a member supply sheet.

13 Claims, 5 Drawing Sheets

(51) Int. Cl.
  *B32B 5/02*    (2006.01)
  *B32B 5/18*    (2006.01)
  *B32B 7/06*    (2019.01)
  *B32B 7/14*    (2006.01)
  *B32B 27/06*   (2006.01)
  *B32B 27/12*   (2006.01)
  *B32B 27/32*   (2006.01)
  *B32B 27/36*   (2006.01)
  *B65H 18/28*   (2006.01)
  *C09J 7/29*    (2018.01)

(52) U.S. Cl.
  CPC .................. *B32B 5/18* (2013.01); *B32B 7/06* (2013.01); *B32B 7/14* (2013.01); *B32B 27/065* (2013.01); *B32B 27/12* (2013.01); *B32B 27/322* (2013.01); *B32B 27/36* (2013.01); *C09J 7/29* (2018.01); *B32B 2262/0253* (2013.01); *B32B 2262/0276* (2013.01); *B32B 2262/124* (2021.05); *B32B 2435/02* (2013.01); *B65H 18/28* (2013.01); *B65H 2701/1842* (2013.01); *C09J 2301/124* (2020.08); *C09J 2423/046* (2013.01); *C09J 2433/00* (2013.01); *C09J 2467/006* (2013.01)

(58) Field of Classification Search
  CPC ....... B32B 27/12; B32B 27/322; B32B 27/36; B32B 2262/0253; B32B 2262/0276; B32B 2262/124; B32B 2435/02; C09J 7/29; C09J 2301/124; C09J 2423/046; C09J 2433/00; C09J 2467/006; B65H 18/28
  See application file for complete search history.

(56) References Cited

U.S. PATENT DOCUMENTS

| | | | |
|---|---|---|---|
| 2011/0117304 A1 | 5/2011 | Ueki et al. | |
| 2016/0228826 A1 | 8/2016 | Furuuchi | |
| 2017/0026742 A1 | 1/2017 | Karube et al. | |
| 2017/0267897 A1 | 9/2017 | Yamamoto et al. | |
| 2018/0242079 A1 | 8/2018 | Seo | |
| 2019/0268679 A1 | 8/2019 | Kurihara et al. | |

FOREIGN PATENT DOCUMENTS

| | | |
|---|---|---|
| CN | 108307636 | 7/2018 |
| DE | 11 2017 003 755 | 4/2019 |
| JP | 2010-4397 | 1/2010 |
| JP | 2015-111816 | 6/2015 |
| KR | 10-2010-0004869 | 1/2010 |
| KR | 10-2012-0101088 | 9/2012 |
| KR | 10-2017-0008436 | 1/2017 |
| WO | 2015/064028 | 5/2015 |

OTHER PUBLICATIONS

English machine translation for JP2010000464 (Year: 2010).*
Technical Data Sheet for VHB-Y4914 from google search for VHB-Y4914.*
China Office Action issued in CN Application No. 202211031070.4, dated Oct. 13, 2023.
China Office Action issued in CN Appl. No. 202080005478.7, dated Jul. 2, 2021, along with an English translation thereof.
China Office Action issued in CN Appl. No. 202080005478.7, dated Nov. 19, 2021, along with an English translation thereof.
Korea Office Action issued in KR Appl. No. 10-2020-7037732, dated May 3, 2021, along with an English translation thereof.
International Search Report issued in International Patent Application No. PCT/JP2020/030270, dated Sep. 29, 2020, along with an English translation thereof.
Written Opinion issued in International Patent Application No. PCT/JP2020/030270, dated Sep. 29, 2020, along with an English translation thereof.
German Official Action received in Application No. 11 2020 003 876.9, dated Feb. 28, 2025, and English language translation thereof.

* cited by examiner

COVER MEMBER AND MEMBER SUPPLY ASSEMBLY INCLUDING SAME

TECHNICAL FIELD

The present invention relates to a cover member to be placed on a face of an object to prevent passage of a foreign matter through an opening of the face, and to a member supply assembly for supplying the member.

BACKGROUND ART

There have been known cover members that are to be placed on a face of an object to prevent passage of a foreign matter through an opening of the face. Patent Literature 1 discloses a waterproof ventilation member including a waterproof gas-permeable film, a first double-sided adhesive tape joined to a peripheral edge portion of one surface of the waterproof gas-permeable membrane, and a second double-sided adhesive tape joined to a peripheral edge portion of the other surface of the waterproof gas-permeable membrane, wherein the first double-sided adhesive tape includes a substrate that is a foam material.

CITATION LIST

Patent Literature

Patent Literature 1: WO 2015/064028

SUMMARY OF INVENTION

Technical Problem

A cover member is usually supplied in a state of being placed on a member supply sheet such as a liner sheet. The cover member supplied in this state is placed on a face of an object after being peeled off from the sheet. At this time, it is efficient to peel off, by suction or holding for lift-up, the farthest layer included in the cover member from the sheet, and subsequently place the cover member on the face of the object. The farthest layer is, for example, a protective membrane or a tab film. However, a low peelability of the cover member from the sheet causes concentration of a force lifting up the cover member and thus the protective membrane might be damaged. A damage is particularly likely to occur in a cover member including a protective membrane having high air permeability in the thickness direction.

The present invention aims to provide a cover member having excellent peelability from a member supply sheet.

Solution to Problem

The present invention provides a cover member to be placed on a face of an object to prevent passage of a foreign matter through an opening of the face, the cover member including:
  a protective membrane having a shape configured to cover the opening when the cover member is placed on the face; and
  a first substrate layer joined to one of principal surfaces of the protective membrane, wherein
  the first substrate layer has a laminated structure including at least two substrate films, and is positioned between the protective membrane and the face when the cover member is placed on the face, and
  the at least two substrate films include a non-foam film and a foam film.

The present invention provides, in another aspect, a member supply assembly including:
  a member supply sheet; and
  a cover member placed on the member supply sheet, wherein
  the cover member is the cover member according to the present invention, and
  the first substrate layer of the cover member faces the member supply sheet.

Advantageous Effects of Invention

In the cover member of the present invention, the first substrate layer having the laminated structure including the at least two substrate films including the non-foam film and the foam film is joined to the protective membrane. When the cover member is placed on the face of the object, the first substrate layer is positioned between the protective membrane and the face. Here, the cover member supplied by using a member supply sheet such as a liner sheet is usually placed such that a side of the cover member that has been in contact with the member supply sheet is in contact with the face of the object. Accordingly, in supply by using the member supply sheet, the first substrate layer is positioned on the member supply sheet side. In peeling-off from the member supply sheet, a force acts for bending the cover member. An excessive deformation of the cover member due to this force makes the peeling-off difficult and thus the protective membrane is easily damaged. However, unless the cover member is bent to some extent, the peeling-off does not proceed smoothly. The cover member of the present invention includes, in the first substrate layer: a non-foam film that is relatively rigid and capable of efficiently transmitting the above force to the cover member as a force for peeling off the member while preventing an excessive deformation; and a foam film that is relatively flexible and allows moderate deformation of the first substrate layer positioned on the member supply sheet side. The cover member of the present invention has a structure suitable for improving the peelability from a member supply sheet.

DESCRIPTION OF EMBODIMENTS

Embodiments of the present invention will be described with reference to the drawings. The present invention is not limited to the following embodiments.

[Cover Member]

Figure 1A:
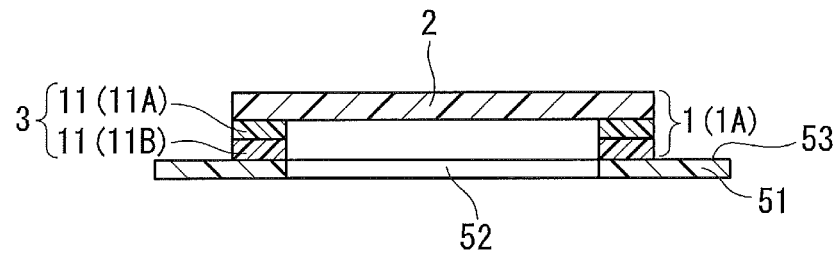
FIG. 1A is a cross-sectional view schematically showing an example of a cover member of the present invention.
Figure 1B:
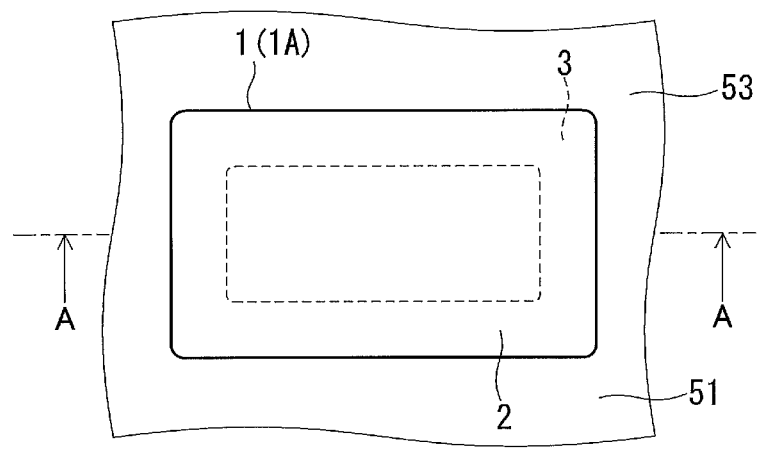
FIG. 1B is a plan view of the cover member in FIG. 1A as seen from the protective membrane side.

FIGS. 1A and 1B show an example of a cover member of the present invention. FIG. 1B is a plan view of a cover member 1 (1A) in FIG. 1A as seen from the protective membrane 2 side. In FIG. 1A, a cross section A-A in FIG. 1B is shown. The cover member 1A is a member to be placed on a face 53, provided with an opening 52, of an object 51 to prevent passage of a foreign matter through the opening 52. In FIGS. 1A and 1B, the cover member 1A placed on the face 53 of the object 51 is shown.

The cover member 1A includes a protective membrane 2 and a first substrate layer 3 joined to one of principal surfaces of the protective membrane 2. The cover member 1A is composed of a laminate including the protective membrane 2 and the first substrate layer 3. The protective membrane 2 has a shape configured to cover the opening 52 when the cover member 1A is placed on the face 53. The first substrate layer 3 is positioned between the protective membrane 2 and the face 53 when the cover member 1A is placed on the face 53.

The first substrate layer 3 has a laminated structure including two substrate films 11. The first substrate layer 3 includes, as the substrate films 11, a non-foam film 11A formed of a non-foam material and a foam film 11B formed of a foam material. The foam film 11B is positioned farther from the protective membrane 2 than the non-foam film 11A is. In this embodiment, when the cover member 1A is peeled off, deformation of the first substrate layer 3 due to the foam film 11B becomes more moderate, and thus the peelability of the cover member 1A can be improved. Also, the substrate film 11 included in the first substrate layer 3 and positioned farthest from the protective membrane 2 is the foam film 11B. In this embodiment, the improvement in peelability based on the above moderate deformation is achieved more reliably.

Figure 2:
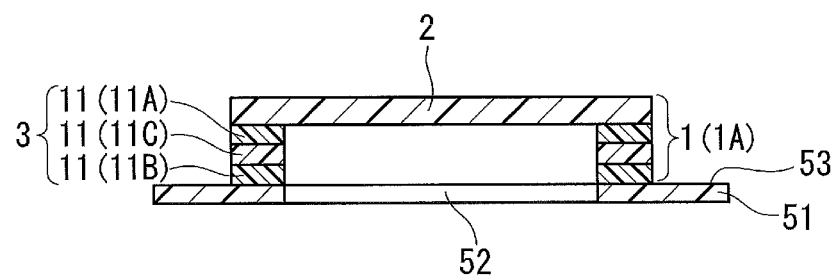
FIG. 2 is a cross-sectional view schematically showing another example of the cover member of the present invention.

The laminated structure of the first substrate layer 3 is not limited to the above example as long as the non-foam film 11A and the foam film 11B are included as the at least two substrate films 11. The first substrate layer 3 may include at least two non-foam films 11A and/or at least two foam films 11B. FIG. 2 shows a modification in which the first substrate layer 3 has a different structure.

The cover member 1A in FIG. 2 has a similar structure to that of the cover member 1A in FIGS. 1A and 1B, except for the structure of the first substrate layer 3. The first substrate layer 3 in FIG. 2 includes, as the substrate films 11, two non-foam films 11A and 11C and one foam film 11B. The non-foam films 11A and 11C and the foam film 11B are laminated in this order. The foam film 11B is positioned farther from the protective membrane 2 than the non-foam films 11A and 11C are. The substrate film 11 included in the first substrate layer 3 and positioned farthest from the protective membrane 2 is the foam film 11B.

The at least two substrate films 11 included in the first substrate layer 3 are usually joined to each other. The substrate films 11 may be joined to each other with an adhesive (a pressure-sensitive adhesive can be used), or may be joined to each other by any of various welding methods such as ultrasonic welding and thermal welding. The adhesive joining the substrate films 11 to each other may be in the form of layer (an adhesive layer). In this embodiment, the flexibility of the adhesive layer can contribute to improvement in peelability. The adhesive layer may be a double-sided adhesive tape with no substrate.

Examples of the adhesive include an acrylic adhesive, a silicone adhesive, a urethane adhesive, an epoxy adhesive, and a rubber adhesive. In the case where the use of the cover member 1A at a high temperature needs to be considered, it is preferable to select an acrylic adhesive or a silicone adhesive having an excellent heat resistance, particularly a silicone adhesive.

Figure 3:
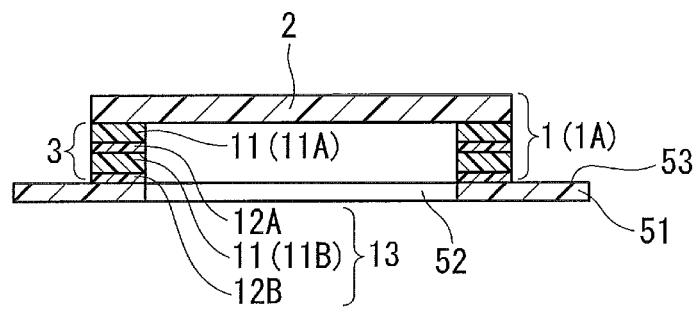
FIG. 3 is a cross-sectional view schematically showing still another example of the cover member of the present invention.
Figure 4:
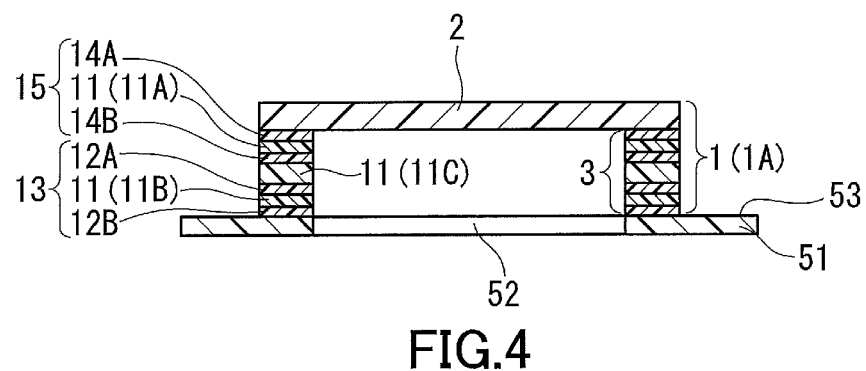
FIG. 4 is a cross-sectional view schematically showing yet another example of the cover member of the present invention.

A substrate and a single-sided adhesive tape or double-sided adhesive tape obtained by applying an adhesive onto a single side or double sides of the substrate may be used as the substrate film 11 and the adhesive layer. FIGS. 3 and 4 show examples of the use of such a double-sided adhesive tape.

In the first substrate layer 3 in FIG. 3, the foam film 11B is the substrate of a double-sided adhesive tape 13. The foam film 11B and the non-foam film 11A are joined to each other with an adhesive layer 12A of the double-sided adhesive tape 13. Also, the cover member 1A in FIG. 3 is placed on the face 53 with an adhesive layer 12B of the double-sided adhesive tape 13 interposed therebetween. Except for these points, the cover member 1A in FIG. 3 has a similar structure to that of the cover member 1A in FIGS. 1A and 1B.

In the first substrate layer 3 in FIG. 4, the foam film 11B is the substrate of the double-sided adhesive tape 13. The foam film 11B and the non-foam film 11C are joined to each other with the adhesive layer 12A of the double-sided adhesive tape 13. The non-foam film 11A is the substrate of a double-sided adhesive tape 15. The non-foam film 11C and the non-foam film 11A are joined to each other with an adhesive layer 14B of the double-sided adhesive tape 15. Also, the protective membrane 2 and the first substrate layer 3 are joined to each other with an adhesive layer 14A of the double-sided adhesive tape 15. The cover member 1A in FIG. 4 is placed on the face 53 with the adhesive layer 12B of the double-sided adhesive tape 13 interposed therebetween. Except for these points, the cover member 1A in FIG. 4 has a similar structure to that of the cover member 1A in FIG. 2.

The protective membrane 2 and the first substrate layer 3 may be joined to each other with an adhesive, or may be joined to each other by any of the above various welding methods. The protective membrane 2 and the first substrate layer 3 may be joined to each other with an adhesive layer 17 (see FIG. 5). In this embodiment, the flexibility of the adhesive layer can contribute to improvement in peelability. Examples of the adhesive and the adhesive layer are as described above. The adhesive layer joining the protective membrane 2 and the first substrate layer 3 to each other may be an adhesive layer (for example, the adhesive layer 14A in FIG. 4) of a single-sided adhesive tape or a double-sided adhesive tape using the substrate film 11 as a substrate.

Figure 5:
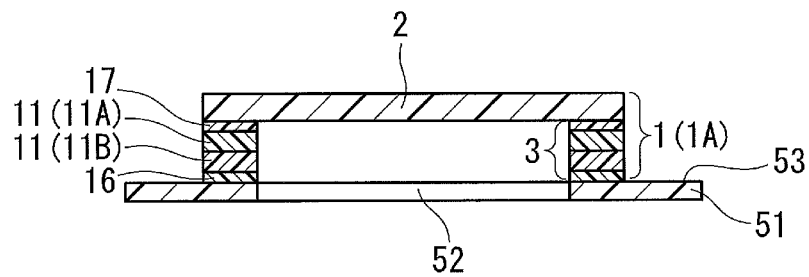
FIG. 5 is a cross-sectional view schematically showing an example of the cover member of the present invention different from the above.

The cover member 1A may be placed on the face 53 with an adhesive layer 16 included in the cover member 1A interposed therebetween (see FIG. 5). Examples of the adhesive layer are as described above. Also, the adhesive layer 16 may be an adhesive layer (for example, the adhesive layer 12B in FIGS. 3 and 4) of a single-sided adhesive tape or a double-sided adhesive tape using the substrate film 11 as the substrate.

The shape of the cover member 1A is a rectangle when viewed perpendicularly to the principal surface of the protective membrane 2. However, the shape of the cover member 1 is not limited to this example. The shape of the cover member 1 may be a polygon including a square and a rectangle, a circle, and an ellipse when viewed perpendicularly to the principal surface of the protective membrane 2. The corners of the polygon may be rounded (see FIG. 1B).

The first substrate layer 3 of the cover member 1A has an outer periphery coinciding with an outer periphery of the protective membrane 2 when viewed perpendicularly to the principal surface of the protective membrane 2. Also, the first substrate layer 3 of the cover member 1A has a shape (frame shape) corresponding to a peripheral edge portion of the protective membrane 2 when viewed perpendicularly to the principal surface of the protective membrane 2. A face of the protective membrane 2 on the first substrate layer 3 side has an exposed region out of contact with the first substrate layer 3. In the case where the protective membrane 2 has air permeability in the thickness direction, this region can be defined as an air-permeable region of the cover member 1A. The shape of the first substrate layer 3 is not limited to the above example.

The air-permeable region in the cover member 1 has an area of, for example, 40 mm$^2$ or less. The cover member 1 having the air-permeable region with an area in this range is suitable for placement on an object, for example, having a small-diameter opening. The lower limit of the area of the air-permeable region is, for example, 0.008 mm$^2$ or more. The area of the air-permeable region may be in a larger range depending on the type of object on which the cover member 1 is to be placed.

The thickness of the first substrate layer 3 is, for example, 50 to 1000 μm, and may be 70 to 800 μm, or even 130 to 600 μm.

The foam film 11B has closed cells. Accordingly, even in the case for example where an adhesive layer is provided on a surface of the foam film 11B, the flexibility can be maintained owing to suppression of impregnation of the adhesive into the film.

Examples of the material forming the foam film 11B include polyolefins such as polyethylene (PE) and polypropylene (PP), silicone resins, acrylic resins, and polyurethanes. However, the material forming the foam film 11B is not limited to the above examples.

The foam film 11B may have no adhesive properties.

The non-foam films 11A and 11C have no closed cells. The non-foam films 11A and 11C may have air permeability in the thickness direction. Examples of the non-foam films 11A and 11C include metal films, resin films, nonwoven fabrics, woven fabrics, and paper. The non-foam films 11A and 11C are preferably resin films.

Examples of a resin that can form the non-foam films 11A and 11C include polyolefins such as PE and PP, polyesters such as polyethylene terephthalate (PET), silicone resins, polycarbonates, polyimides, polyamideimides, polyphenylene sulfides, polyetheretherketones (PEEK), polyvinyl chlorides, and fluororesins. Examples of the fluororesins include polytetrafluoroethylene (PTFE), tetrafluoroethylene-perfluoroalkyl vinyl ether copolymer (PFA), tetrafluoroethylene-hexafluoropropylene copolymer (FEP), and tetrafluoroethylene-ethylene copolymer (ETFE). However, the resin is not limited to the above examples.

Examples of a metal that can form the non-foam films 11A and 11C include stainless steel and aluminum. However, the metal is not limited to the above examples.

The non-foam films 11A and 11C may have no adhesive properties.

The foam film 11B and the non-foam films 11A and 11C may have the same shape when viewed perpendicularly to the first substrate layer 3. Also, outer peripheries of the substrate films 11 included in the first substrate layer 3 may coincide with each other.

The thickness of each of the substrate films 11 is, for example, 10 to 250 μm.

The substrate films 11, particularly the non-foam films 11A and 11C, may have a higher strength than the protective membrane 2. In this case, a damage to the protective membrane 2 at peeling-off can be suppressed. The strength can be evaluated as, for example, the tensile break strength or the cohesive failure strength.

The protective membrane 2 may have no air permeability in the thickness direction, or may have air permeability in the thickness direction. In the case where the protective membrane 2 has air permeability in the thickness direction, placement of the cover member 1 allows to achieve ventilation through an opening of an object while preventing passage of a foreign matter through the opening. By achieving ventilation, it is possible to perform adjustment of pressure or relaxation of pressure variation through the opening, for example.

The protective membrane 2 that has air permeability in the thickness direction has an air permeability (an air permeability in the thickness direction) of, for example, less than 10,000 seconds/100 mL, as represented by an air permeability obtained according to Method B (Gurley method) of air permeability measurement specified in Japanese Industrial Standards (hereinafter, referred to as "JIS") L1096. Hereinafter, the air permeability thus obtained is referred to as "Gurley air permeability". The Gurley air permeability may be 5000 seconds/100 mL or less, 1000 seconds/100 mL or less, 500 seconds/100 mL or less, 100 seconds/100 mL or less, 50 seconds/100 mL or less, 10 seconds/100 mL or less, or even 5 seconds/100 mL or less. The lower limit of the Gurley air permeability is, for example, 0.2 seconds/100 mL or more.

The protective membrane 2 that has no air permeability in the thickness direction has an air permeability of, for example, 10000 seconds/100 mL or more as represented by the Gurley air permeability.

Examples of the material forming the protective membrane 2 include a metal, a resin, and a composite material thereof.

Examples of the resin and the metal that can form the protective membrane 2 are the same as the examples of the resin and the metal that can form the substrate films 11.

The resin forming the protective membrane 2 may be PTFE. However, the resins and the metal are not limited to the above examples.

The protective membrane 2 that has air permeability in the thickness direction may include a stretched porous membrane. The stretched porous membrane may be a stretched porous fluororesin membrane, particularly a stretched porous PTFE membrane. The stretched porous PTFE membrane is formed usually by stretching a paste extrusion or a cast membrane containing PTFE particles. The stretched porous PTFE membrane is formed of fine PTFE fibrils, and may have nodes in which PTFE is in a cohesive state compared to fibrils. The stretched porous PTFE membrane can achieve both properties of preventing entry of a foreign matter and air permeability at a high level. A known stretched porous membrane can be used as the protective membrane 2.

The protective membrane 2 that has air permeability in the thickness direction may include a perforated membrane having a plurality of through-holes connecting principal surfaces of the perforated membrane to each other. The perforated membrane may be a membrane where a plurality of through-holes are provided in an original membrane having a non-porous substrate structure, for example a non-porous membrane. The perforated membrane may have no ventilation path in the thickness direction other than the above plurality of through-holes. The through-holes may extend in the thickness direction of the perforated membrane, or may be straight holes extending linearly in the thickness direction. The shape of openings of the through-holes may be a circle or an ellipse when viewed perpendicularly to the principal surface of the perforated membrane. The perforated membrane can be formed for example by performing a laser process on an original membrane, or performing a hole formation process of ion beam irradiation followed by chemical etching on an original membrane.

The protective membrane 2 that has air permeability in the thickness direction may include a nonwoven fabric, a woven fabric, a mesh, and/or a net.

The protective membrane 2 may have a single-layer structure, or may have a multilayer structure including at least two different layers. The protective membrane 2 that has a multilayer structure, for example, has a laminated structure including a stretched porous PTFE membrane and a nonwoven fabric.

The protective membrane 2 is not limited to the above example.

The shape of the protective membrane 2 of the cover member 1A is a rectangle when viewed perpendicularly to the principal surface of the protective membrane 2. However, the shape of the protective membrane 2 is not limited to the above example, and may be, for example, a polygon including a square and a rectangle, a circle, and an ellipse when viewed perpendicularly to the principal surface of the protective membrane 2. The corners of the polygon may be rounded.

The thickness of the protective membrane 2 is, for example, 1 to 100 μm.

The cohesive force of the protective membrane 2 may be 2.0 N/20 mm or less. The protective membrane 2 that has high air permeability in the thickness direction tends to have a low cohesive force. Accordingly, in conventional cover members including the protective membrane 2 having high air permeability in the thickness direction, the protective membrane 2 is easily damaged at peeling-off. In contrast, in the cover member 1, even when including the protective membrane 2 having high air permeability in the thickness direction, a damage to the protective membrane 2 can be suppressed. In other words, in the case where the cover member 1 includes the protective membrane 2 having high air permeability in the thickness direction, the present invention is particularly advantageous. The cohesive force of the protective membrane 2 may be 1.8 N/20 mm or less, or even 1.5 N/20 mm or less. The protective membrane 2 that has high air permeability in the thickness direction has an air permeability of, for example, 100 seconds/100 mL or less as represented by the Gurley air permeability.

The cohesive force of the protective membrane 2 can be measured by the following method with reference to the method for measuring the 180° peel adhesion specified in JIS Z0237: 2009.

<Preparation of Test Piece>

First, the protective membrane 2 that is a measurement target is cut into a rectangle (having a length of 100 mm×a width of 20 mm). Next, prepared are two double-sided adhesive tapes (No. 5610 manufactured by Nitto Denko Corporation) having the same shape as the protective membrane 2. The double-sided adhesive tapes are each attached to a different one of faces of the protective membrane 2 such that outer peripheries of the respective double-sided adhesive tapes coincide with the outer peripheries of the faces of the protective membrane 2. Next, prepared are two rectangular PET films having a length of 150 mm×a width of 20 mm (a thickness of 25 μm). The PET films are each attached to a different one of the faces of the protective membrane 2 with a corresponding one of the above double-sided adhesive tapes. The attachment of the PET films is performed such that both end portions of each of the PET films in the width direction coincide with both end portions of the protective membrane 2 in the width direction, and such that both end portions of each of the PET films in the longitudinal direction do not overlap the protective membrane 2 and the double-sided adhesive tapes when viewed perpendicularly to the principal surface of the PET film. Note that the length (in the longitudinal direction) of a free end portion of each of the PET films is set to be a length (for example, 25 mm) enough for a chuck of a tensile testing machine to stably grip the PET film. Next, a pressure-bonding roller with a load of 19.6 N is reciprocated once such that a pressure-bonding force is applied in the thickness direction of a laminate composed of the PET film/the double-sided adhesive tape/the protective membrane 2/the double-sided adhesive tape/the PET film. Then, the laminate was left for at least 30 minutes before the start the tensile test. A test piece is thus obtained.

<Cohesive Force Measurement by Tensile Test on Protective Membrane 2>

Next, prepared is a tensile testing machine (for example, a desktop precision universal testing machine, Autograph AGS-X, manufactured by Shimadzu Corporation). The free end portion of one of the PET films at one of end portions in the longitudinal direction of the test piece is fixed to an upper chuck of the tensile testing machine. The free end portion of the other PET film at the other end portion in the longitudinal direction of the test piece is fixed to a lower chuck. Next, under conditions of a measurement temperature of 25±5° C., a measurement humidity of 60±5% RH, and a tensile speed of 300 mm/min, a tensile test is performed in which a lower end portion of the other PET film is tensioned downwards to cause a cohesive failure in the protective membrane 2. After the start of displacement of the PET film due to the cohesive failure of the protective membrane 2, a stress between the chucks measured at the initial displacement of 25 mm is ignored, and measured values of the stress continuously recorded at a subsequent displacement of 50 mm are averaged. The average value is determined as the cohesive force (unit: N/25 mm) of the protective membrane 2.

The area of the protective membrane 2 is, for example, 175 mm² or less. The cover member 1 including the protective membrane 2 having an area in this range is suitable for, for example, placement on an object having a small-diameter opening. The lower limit of the area of the protective membrane 2 is, for example, 0.20 mm² or more. However, the area of the protective membrane 2 may be a larger value depending on the type of object on which the cover member 1 is to be placed.

The area of the cover member 1 is, for example, 175 mm² or less. The cover member 1 having an area in this range is suitable for, for example, placement on an object having a small-diameter opening. The lower limit of the area of the cover member 1 is, for example, 0.20 mm² or more. However, the area of the cover member 1 may be a larger value depending on the type of object on which the cover member 1 is to be placed. Noted that the cover member 1 having a smaller area is more difficult to be peeled off from a member supply sheet. Accordingly, in the case where the area of the cover member 1 is in the above range, the effect of the present invention is particularly remarkable.

The cover member 1 may include any layer and/or member other than those described above as long as the effect of the present invention is achieved.

Figure 6A:
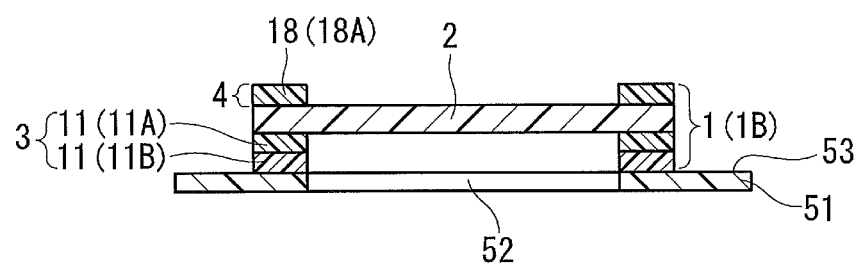
FIG. 6A is a cross-sectional view schematically showing an example of the cover member of the present invention different from the above.
Figure 6B:
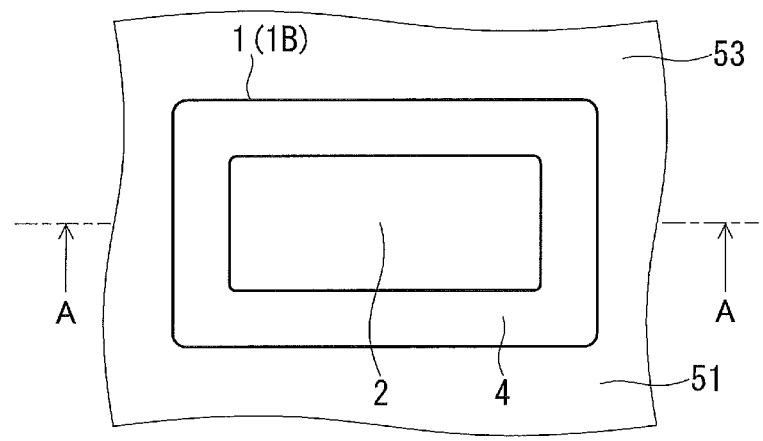
FIG. 6B is a plan view of the cover member in FIG. 6A as seen from the second substrate layer side.

FIGS. 6A and 6B show an example of the cover member of the present invention different from the above. FIG. 6B is a plan view of the cover member 1 (1B) in FIG. 6A as seen from the second substrate layer 4 side. In FIG. 6A, a cross-section A-A in FIG. 6B is shown. In FIGS. 6A and 6B, the cover member 1B placed on the face 53 of the object 51 is shown. The cover member 1B has a similar structure to that of the cover member 1A, except for further including a second substrate layer 4 including at least one, specifically, a single or at least two substrate films 18.

The second substrate layer 4 is joined to the other principal surface of the protective membrane 2 such that the second substrate layer 4 and the first substrate layer 3 sandwich the protective membrane 2 therebetween. In this embodiment, a damage to the protective membrane 2 at peeling-off can be suppressed more reliably. Also, in the case where the cover member 1 includes a tab film 5, which is described later, a damage to the protective membrane 2 at peeling-off of the tab film 5 can be suppressed.

The second substrate layer 4 may include, as the substrate film 18, only a non-foam film 18A formed of a non-foam material. The substrate film 18 and the non-foam film 18A can have similar structure to those of the substrate films 11 and the non-foam film 11A, respectively.

The substrate film 11 included in the first substrate layer 3 and positioned closest to the protective membrane 2 may have the same structure as the substrate film 18 included in the second substrate layer 4 and closest to the protective membrane 2. In this embodiment, a damage to the protective membrane 2 can be suppressed more reliably.

The second substrate layer 4 may include at least two substrate films 18. The at least two substrate films 18 may have the same shape when viewed perpendicularly to the second substrate layer 4. Also, outer peripheries of the at least two substrate films 18 included in the second substrate layer 4 may coincide with each other. The at least two substrate films 18 are usually joined to each other. A method for joining the substrate films 18 may be the same as a method for joining the substrate films 11.

Figure 7:
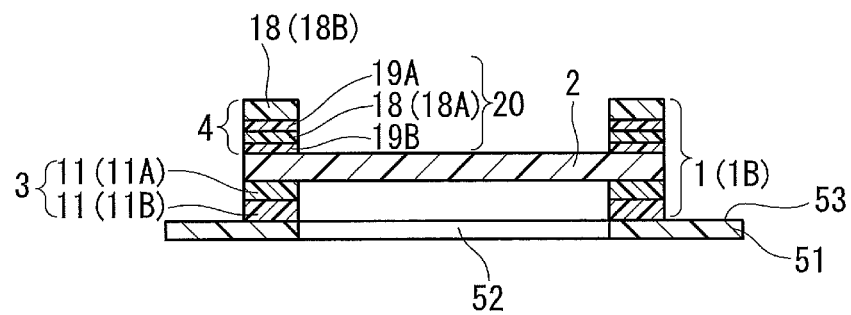
FIG. 7 is a cross-sectional view schematically showing an example of the cover member of the present invention different from the above.

A substrate and a single-sided adhesive tape or a double-sided adhesive tape obtained by applying an adhesive onto a single side or both sides of the substrate may be used as the substrate film 18 and the adhesive layer. FIG. 7 shows an example of the use of such a double-sided adhesive tape.

The second substrate layer 4 in FIG. 7 includes, as the substrate films 18, two non-foam films 18A and 18B. The non-foam film 18A is the substrate of a double-sided adhesive tape 20. The non-foam film 18A and the non-foam film 18B are joined to each other with an adhesive layer 19A of the double-sided adhesive tape 20. Also, the protective membrane 2 and the second substrate layer 4 are joined to each other with an adhesive layer 19B of the double-sided adhesive tape 20. Except for these points, the cover member 1B in FIG. 7 has a similar structure to that of the cover member 1B in FIGS. 6A and 6B.

The protective membrane 2 and the second substrate layer 4 may be joined to each other with an adhesive, or may be joined to each other by any of the above various welding methods. The protective membrane 2 and the second substrate layer 4 may be joined to each other with an adhesive layer. Examples of the adhesive and the adhesive layer are as described above. Also, the adhesive layer joining the protective membrane 2 and the second substrate layer 4 to each other may be an adhesive layer (for example, the adhesive layer 19B in FIG. 7) of a single-sided adhesive tape or a double-sided adhesive tape using the substrate film 18 as the substrate.

The second substrate layer 4 of the cover member 1B has an outer periphery coinciding with the outer periphery of the protective membrane 2 when viewed perpendicularly to the principal surface of the protective membrane 2. Also, the second substrate layer 4 of the cover member 1B has a shape (frame shape) corresponding to the peripheral edge portion of the protective membrane 2 when viewed perpendicularly to the principal surface of the protective membrane 2. A face of the protective membrane 2 on the second substrate layer 4 side has an exposed region out of contact with the second substrate layer 4. In the case where the protective membrane 2 has air permeability in the thickness direction, this region can be defined as the air-permeable region of the cover member 1. The shape of the second substrate layer 4 is not limited to the above example.

The thickness of the second substrate layer 4 is, for example, 10 to 700 μm, and may be 30 to 300 μm.

Figure 8A:
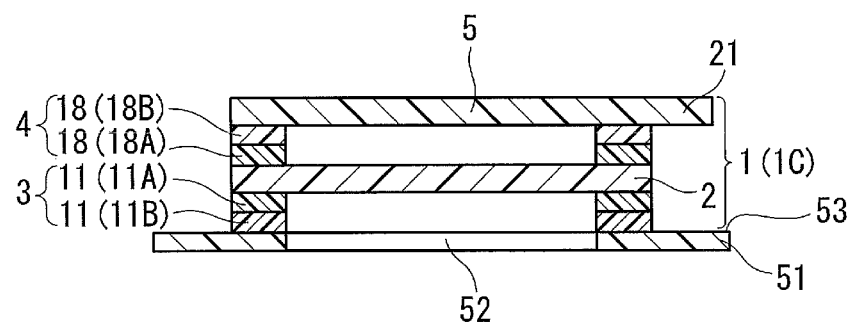
FIG. 8A is a cross-sectional view schematically showing an example of the cover member of the present invention different from the above.
Figure 8B:
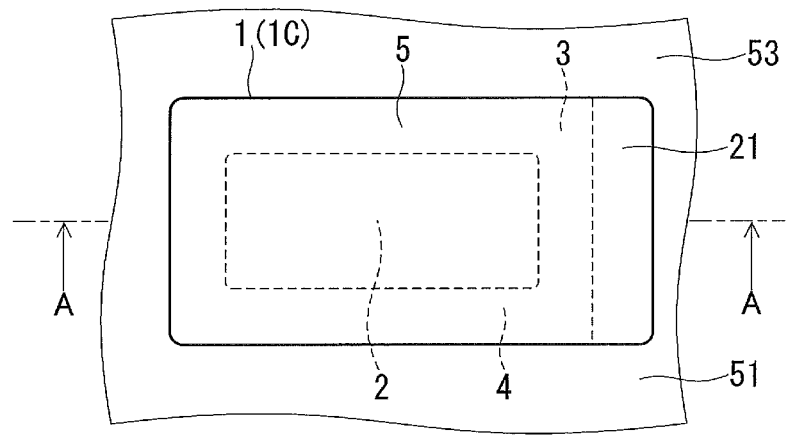
FIG. 8B is a plan view of the cover member in FIG. 8A as seen from the tab film side.

FIGS. 8A and 8B show an example of the cover member of the present invention different from the above. FIG. 8B is a plan view of the cover member 1 (1C) in FIG. 8A as seen from the tab film 5 side. In FIG. 8A, a cross section A-A in FIG. 8B is shown.

In FIGS. 8A and 8B, the cover member 1C placed on the face 53 of the object 51 is shown. The cover member 1C has a similar structure to that of the cover member 1B, except for further including the tab film 5.

The tab film 5 is placed on the outermost layer of the cover member 1. The outermost layer is positioned farthest from the face 53 when the cover member 1 is placed on the face 53. The outermost layer in the example in FIGS. 8A and 8B is the substrate film 18 (18B) included in the second substrate layer 4. The tab film 5 has a tab 21 protruding outward more than an outer periphery of the outermost layer when viewed perpendicularly to the principal surface of the outermost layer. The shape of the tab 21 in FIGS. 8A and 8B is a rectangle when viewed perpendicularly to the principal surface of the tab film 5. The shape of the tab 21 is not limited to this example. Note that the term outward as used herein means a direction away from the center of the cover member 1 when viewed perpendicularly to the principal surface of the protective membrane 2.

Usually, the tab film 5 is removed when the cover member 1 is used. The tab film 5 is removed, for example, after the cover member 1 is peeled off from a member supply sheet thus to be placed on the face 53 of the object 51. Peeling-off from the member supply sheet and/or removal of the tab film 5 may be performed by holding the tab 21.

The peel force between the tab film 5 and the outermost layer may be larger than the peel force between the member supply sheet and the cover member 1. Note that the peel force means a force necessary for peeling off, from two layers and/or members joined to each other, one of the layers or one of the members.

Peeling-off of the cover member 1 from the member supply sheet can be performed, for example, by suctioning or holding to lift up the layer included in the cover member 1 and positioned farthest from the member supply sheet. This layer is, for example, the protective membrane 2 or the tab film 5. However, the embodiment of peeling off the cover member 1 is not limited to the above example.

The object 51 on which the cover member 1 is to be placed is, for example, a housing of an electronic device. The cover member 1 can be placed on an outer surface and/or an inner surface of the housing of the electronic device. At this time, the opening may be a ventilation port and/or a sound-transmitting port provided in the housing of the electronic device. Examples of the electronic device include: wearable devices such as a smart watch and a wristband; various cameras including an action camera and a security camera; information communication devices such as a mobile phone and a smartphone; virtual reality (VR) devices; augmented reality (AR) devices; and sensor devices. However, the electronic devices are not limited to these examples.

A foreign matter prevented from passing by placement of the cover member 1 is, for example, particles such as dust or liquid water such as a water droplet.

Figure 9:
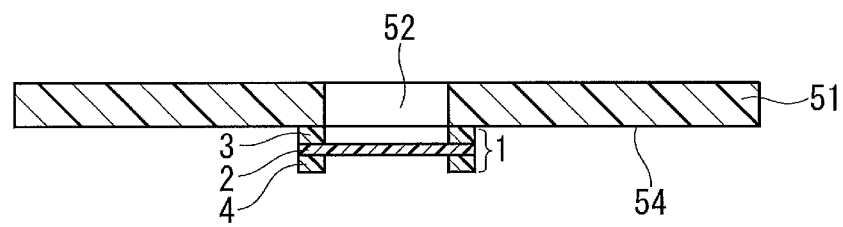
FIG. 9 is a schematic view showing an example of placement of the cover member of the present invention on an object.
Figure 10:
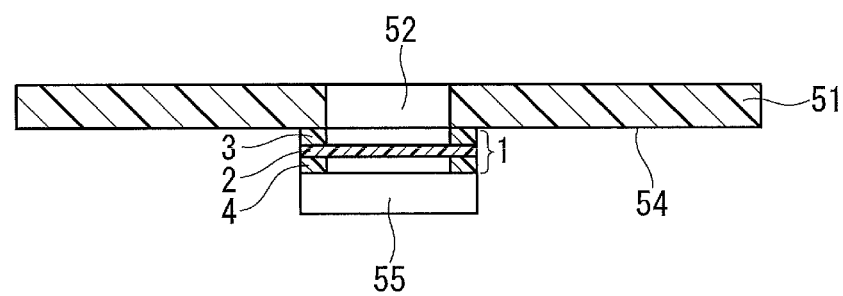
FIG. 10 is a schematic view showing another example of placement of the cover member of the present invention on an object.

FIGS. 9 and 10 show examples of embodiments in which the cover member 1 is used.

In the example in FIG. 9, the cover member 1 is placed on an inner surface 54 of a housing 51 of an electronic device that is an object. The housing 51 is provided with the opening 52, and the cover member 1 is placed on the inner surface 54 such that the protective membrane 2 covers the opening 52. When the cover member 1 is placed on the inner surface 54, the first substrate layer 3 is positioned between the protective membrane 2 and the inner surface 54. The second substrate layer 4 faces a space inside the housing 51. The first substrate layer 3 surrounds the opening 52 when viewed perpendicularly to the inner surface 54. The protective membrane 2 prevents passage of a foreign matter through the opening 52. The cover member 1 can function as a member for preventing passage of a foreign matter through the opening 52 while achieving transmission of sound through the opening 52. Also, in the case where the protective membrane 2 has air permeability in the thickness direction, ventilation through the protective membrane 2 is achieved. At this time, the cover member 1 can function as a member for preventing passage of a foreign matter through the opening 52 while achieving ventilation through the opening 52.

In the example in FIG. 10, the second substrate layer 4 is in contact with a semiconductor element 55. Except for this point, the example is similar to the example in FIG. 9. The semiconductor element 55 is placed inside the housing 51. The semiconductor element 55 may be provided with an opening for ventilation and/or sound transmission. At this time, the second substrate layer 4 may surround the opening when viewed perpendicularly to a face of the semiconductor element 55 having the opening. Examples of the semiconductor element 55 include various sensor elements for detecting atmospheric pressure, humidity, gas, air flow, acceleration, etc., and acoustic conversion elements such as a speaker and a microphone. The cover member 1 can function as a member for preventing passage of a foreign matter from the outside of the housing 51 into the semiconductor element 55 while achieving ventilation and/or sound transmission through the opening 52 and the opening of the semiconductor element 55.

The embodiment of using the cover member 1 is not limited to the above examples.

The cover member 1 can be formed, for example, by shape process and lamination of the protective membrane 2, the substrate films 11 and 18, and the tab film 5.

[Member Supply Assembly]

Figure 11:
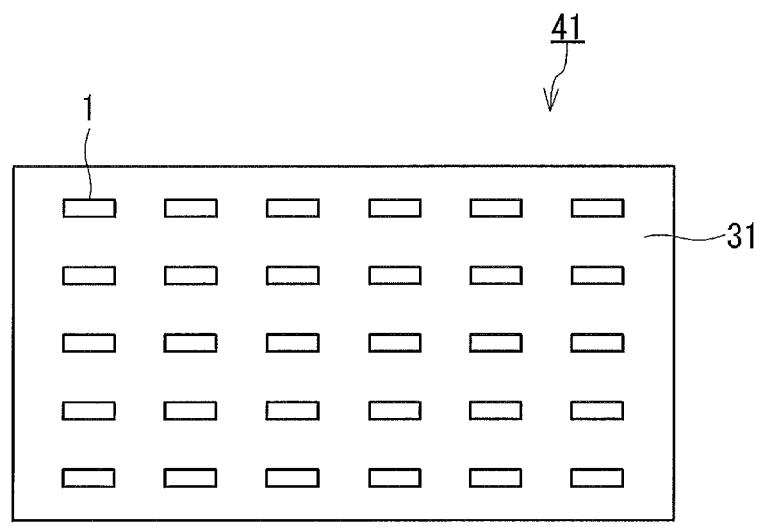
FIG. 11 is a plan view schematically showing an example of a member supply assembly of the present invention.

The cover member 1 can be supplied by using a member supply sheet. FIG. 11 shows an example of a member supply assembly that is an embodiment of supplying the cover member 1 by using the member supply sheet. A member supply assembly 41 in FIG. 11 includes a member supply sheet 31 and at least one, specifically, a single or at least two cover members 1 placed on the sheet 31. In each of the cover members 1, the first substrate layer 3 faces the sheet 31. According to the member supply assembly 41, for example, the cover members 1 can be efficiently supplied in a step of placing the cover members 1 on a face of an object.

Figure 12:
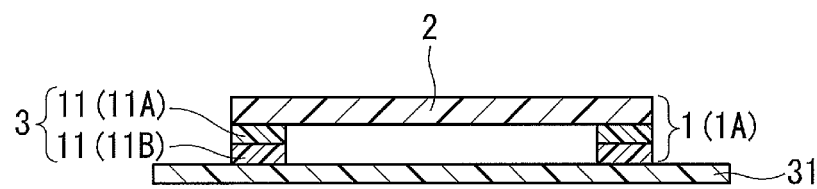
FIG. 12 is a cross-sectional view schematically showing an example of placement of the cover member of the present invention on a member supply sheet.
Figure 13:
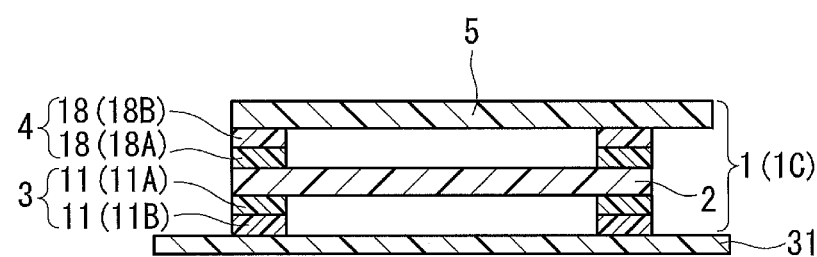
FIG. 13 is a cross-sectional view schematically showing another example of placement of the cover member of the present invention on a member supply sheet.

FIGS. 12 and 13 show examples of placement of the cover member 1 on the sheet 31. In the example in FIG. 12, the cover member 1A in FIG. 1A is placed on the sheet 31. In the example in FIG. 13, the cover member 1C in FIG. 8A is placed on the sheet 31. The adhesive layer 16 (see FIG. 5) can be used to place the cover member 1 on the sheet 31. Also, the cover member 1 may be placed on the sheet 31 with an adhesive layer, provided on a placement surface of the sheet 31 for placing the cover member 1, interposed therebetween. The adhesive layer on the placement surface preferably has weak adhesive properties.

Examples of the material forming the sheet 31 include paper, a metal, a resin, and a composite material thereof. Examples of the metal include stainless steel and aluminum. Examples of the resin include polyesters such as PET and polyolefins such as PE and PP. However, the material forming the sheet 31 is not limited to the above examples.

The thickness of the sheet 31 is, for example, 1 to 250 µm.

The member supply assembly 41 in FIG. 11 includes the sheet 31 that is rectangular when viewed perpendicularly to the principal surface of the sheet 31. However, the shape of the sheet 31 is not limited to this example. The shape of the sheet 31 may be a polygon (for example, a square) other than a rectangle, a circle, an ellipse, or a band when viewed perpendicularly to the principal surface of the sheet 31. The corners of the polygon may be rounded.

In the member supply assembly 41 in FIG. 11, a plurality of cover members 1 are placed on the sheet 31 in a regular arrangement pattern. More specifically, the plurality of cover members 1 are placed at intersections of virtual lattices on the placement surface. However, the embodiment of placing the cover members 1 in the member supply assembly 41 is not limited to the above example.

The member supply assembly 41 in FIG. 11 is rectangular when viewed perpendicularly to the principal surface of the assembly 41. However, the shape of the member supply assembly 41 is not limited to the above example. The shape of the member supply assembly 41 may be a polygon (for example, a square) other than a rectangle, a circle, an ellipse, or a band when viewed perpendicularly to the principal surface of the assembly 41. The corners of the polygon may be rounded. The shape of the member supply assembly 41 may be the same as the shape of the sheet 31. The member supply assembly 41 that is band-shaped usually includes the sheet 31 that is band-shaped. The band-shaped member supply assembly 41 may be a wound body (may be wound to form a wound body). The band-shaped member supply assembly 41 may be wound around a core to form a wound body.

The member supply assembly 41 can be manufactured by placing the cover members 1 on the sheet 31.

EXAMPLES

Hereinafter, the present invention will be described in more detail by way of Examples. The present invention is not limited to embodiments shown in Examples.

First, a cover member evaluation method is described.
[Peelability of Cover Member from Member Supply Sheet]

With respect to each of cover members of Examples and Comparative Examples, the peelability from a member supply sheet was evaluated as follows. The cover member produced was left under an atmosphere at a temperature of 23° C. and a humidity of 65% RH for 24 hours to stabilize joining between layers forming the cover member and joining between the cover member and a member supply sheet. Next, the cover member was peeled off from the member supply sheet by holding a side surface of the cover member (Examples 1 and 2 and Comparative Examples 1 to 3) or a tab of a tab film (Examples 3 to 7 and Comparative Examples 4 and 5) with tweezers to lift it up. A case evaluated as excellent was a case in which the cover member could be peeled off with no damage such as cracks in a protective membrane and with no bending of the member supply sheet. A case evaluated as poor was a case in which no damage such as cracks occurred in the protective membrane but peeling-off of the cover member needed the member supply sheet to be bent (such that the placement surface for the cover member faces outward). A case evaluated as unacceptable was a case in which although the member supply sheet was bent, a damage such as cracks occurred in the protective membrane at peeling-off.
[Damage to Protective Membrane at Peeling-Off of Tab Film]

With respect to each of the cover members including a first substrate layer, a second substrate layer, and the tab film of Examples 3 to 7 and Comparative Examples 4 and 5, evaluation was performed as follows as to whether the protective membrane was damaged at peeling-off of the tab film. The cover member produced was left under an atmosphere at a temperature of 23° C. and a humidity of 65% RH for 24 hours to stabilize joining between the layers forming the cover member and joining between the cover member and the member supply sheet. Next, the cover member was peeled off from the member supply sheet by holding the tab of the tab film with tweezers to lift it up. Next, the peeled cover member was adhered to a surface of a polycarbonate plate with the first substrate layer interposed therebetween. Next, the tab film was peeled off from the second substrate layer by holding the tab with tweezers. At this time, a case in which a damage such as cracks occurred in the protective membrane was evaluated as Yes, and a case in which no damage such as cracks occurred was evaluated as No.

[Peel Force Between First Substrate Layer and Member Supply Sheet]

Separately from the production of each of the cover members of Examples and Comparative Examples, the peel force between the first substrate layer and the member supply sheet was evaluated as follows according to the method for measuring the 180° peel adhesion specified in JIS Z0237: 2009.

First, prepared were the member supply sheet used for each of the cover members and a double-sided adhesive tape used for contact with the member supply sheet in each of the cover members. Next, the member supply sheet and the double-sided adhesive tape were attached to each other under an atmosphere at a temperature of 23° C. and a humidity of 65% RH, and were left under the atmosphere for 24 hours to stabilize the joining therebetween. In the attachment, a pressure-bonding roller having a mass of 2 kg was reciprocated once. Next, a laminate of the member supply sheet and the double-sided adhesive tape was cut into a rectangle (having a length 120 mm×a width 30 mm). A test piece was thus obtained. Next, under measurement conditions of a measurement temperature of 23° C., a measurement humidity of 65% RH, and a tensile speed of 300 mm/min, a 180° peel test for peeling off the double-sided adhesive tape from the member supply sheet was performed to measure a 180° peel adhesion (unit: N/30 mm). A tensile testing machine used was a desktop precision universal testing machine, Autograph AGS-X (manufactured by Shimadzu Corporation). The obtained 180° peel adhesion was determined as the peel force between the first substrate layer and the member supply sheet.
[Cover Member Including First Substrate Layer]

Example 1

<Preparation of Protective Membrane>

Uniformly mixed were 100 parts by weight of PTFE fine powder (POLYFLON PTFE F-104 manufactured by Daikin Industries, Ltd.) and 20 parts by weight of n-dodecane (manufactured by Japan Energy Corporation) as a molding aid. The obtained mixture was compressed using a cylinder and then was ram-extruded to form a sheet-like mixture. Next, the sheet-like mixture was passed between a pair of metal rolls to be rolled so as to have a thickness of 0.2 mm, and then was heated at 150° C. to remove the molding aid. A PTFE sheet molded body was thus formed. Next, the formed sheet molded body was stretched in the longitudinal direction at a stretch temperature of 260° C. and a stretch ratio of 1.5 times. Next, the sheet molded body was stretched in the width direction at a stretch temperature of 150° C. and a stretch ratio of 6.5 times, and furthermore was sintered at 360° C. for 10 minutes. A protective membrane A that is a stretched porous PTFE membrane was thus obtained. The protective membrane A had a cohesive force of 2.0 N/20 mm. The cohesive force of the protective membrane A was evaluated by the above-described method.

Next, a nonwoven fabric (having a thickness of 270 μm and a weight per unit area of 70 g/m$^2$) was joined to one of principal surfaces of the protective membrane A. A protective membrane B was thus obtained. This nonwoven fabric was formed of a composite fiber having a core-sheath structure with a PET core and a polyethylene sheath. The protective membrane A and the nonwoven fabric were joined to each other by thermal lamination (at a temperature of 200° C. and a pressure of 0.2 MPa).

<Preparation of First Substrate Layer>

A laminate was prepared that includes a double-sided adhesive tape A (No. 57120B having a thickness of 100 μm, manufactured by Nitto Denko Corporation), a PET film A (LUMIRROR #25S10 having a thickness of 25 μm and being non-foam, manufactured by Toray Industries, Inc.), and a double-sided adhesive tape B (No. 5603 having a thickness of 30 μm, manufactured by Nitto Denko Corporation) (the layers were disposed in this order). The substrate of the double-sided adhesive tape A was a PE foam film (having a thickness of 60 μm). The substrate of the double-sided adhesive tape B was a PET non-foam film (having a thickness of 12.5 μm). Next, the laminate was punched into a frame shape having an outer shape of 11 mm×10 mm and an inner shape of 6.8 mm×3.8 mm. A first substrate layer A was thus obtained. The first substrate layer A included, as substrate films, two non-foam films and one foam film. Adhesives of the double-sided adhesive tapes A and B were acrylic.

<Preparation of Member Supply Sheet>

A PET sheet (PET75×1-JOL having a thickness of 75 μm, manufactured by NIPPA) was prepared as a member supply sheet. The sheet prepared was a rectangle having a length of 160 mm and a width of 60 mm.

<Production of Cover Member>

The protective membrane B and the first substrate layer A were joined to each other with the double-sided adhesive tape B of the first substrate layer A. The joining was performed such that the double-sided adhesive tape B and a stretched porous PTFE membrane were in contact with each other. Next, the entire joined body was punched into a rectangle having an outer shape of 9 mm×6 mm. A cover member of Example 1 was thus obtained. The punching was performed such that the center of the inner shape of the first substrate layer A having a frame shape coincides with the center of the entire joined body after the punching. Next, the cover member was placed on the member supply sheet with the double-sided adhesive tape A interposed therebetween. In this state, among the substrate films included in the first substrate layer A, the foam film, which is the substrate of the double-sided adhesive tape A, was positioned farthest from the protective membrane B and closest to the member supply sheet.

Example 2

A cover member was obtained in a similar manner to that of Example 1, except that a nonwoven fabric (having a thickness of 105 μm and a weight per unit area of 30 g/m$^2$) formed of a composite fiber having a core-sheath structure with a PET core and a low-melting copolymer polyester sheath was used as the nonwoven fabric to be joined to the protective membrane A. The protective membrane included in the cover member of Example 2 is referred to as a protective membrane C. The cover member was placed on a member supply sheet with the double-sided adhesive tape A of the first substrate layer A interposed therebetween.

Comparative Example 1

A cover member was obtained in a similar manner to that of Example 1, except that the first substrate layer B was used instead of the first substrate layer A. The first substrate layer B used was a double-sided adhesive tape C (No. 5610, having a thickness of 100 μm, manufactured by Nitto Denko Corporation). The substrate of the double-sided adhesive tape C was a PET non-foam film (having a thickness of 50 μm). The first substrate layer B included, as a substrate film, one non-foam film. An adhesive of the double-sided adhesive tape C was acrylic. The cover member was placed on a member supply sheet with the double-sided adhesive tape C of the first substrate layer B interposed therebetween.

Comparative Example 2

A cover member was obtained in a similar manner to that of Example 2, except that the first substrate layer C was used instead of the first substrate layer A. The first substrate layer C used was the double-sided adhesive tape A. The first substrate layer C included, as a substrate film, one foam film. The cover member was placed on a member supply sheet with the double-sided adhesive tape A of the first substrate layer C interposed therebetween.

Comparative Example 3

A cover member was obtained in a similar manner to that of Example 2, except that the first substrate layer B was used instead of the first substrate layer A. The cover member of Comparative Example 3 was placed on a member supply sheet with the double-sided adhesive tape C of the first substrate layer B interposed therebetween.

Table 1 shows the structure of the first substrate layer. Table 2 shows the structures and evaluation results of Examples 1 and 2 and Comparative Examples 1 to 3. "Foam" and "Non-foam" in Table 1 indicate, as the substrate of the double-sided adhesive tape, a foam film and a non-foam film, respectively.

TABLE 1

| First substrate layer A | (Protective membrane side) |
| | Double-faced adhesive tape B (non-foam)/ |
| | PET film A (non-foam)/ |
| | Double-faced adhesive tape A (foam) |
| | (Member supply sheet side) |
| First substrate layer B | Double-faced adhesive tape C (non-foam) |
| First substrate layer C | Double-faced adhesive tape A (foam) |

TABLE 2

| | Example 1 | Example 2 | Comparative Example 1 | Comparative Example 2 | Comparative Example 3 |
|---|---|---|---|---|---|
| Protective membrane | B | C | B | C | C |
| First substrate layer | A | A | B | C | B |
| Peel force[1] (N/30 mm) | | | 0.5 | | |
| Peelability[2] | Excellent | Excellent | Unacceptable | Poor | Unacceptable |

[1] Peel force indicates peel force between first substrate layer and member supply sheet
[2] Peelability indicates peelability of cover member from member supply sheet As shown in Table 1, the cover members of Examples, each of which included the first substrate layer including the non-foam film and the foam film, were excellent in peelability, compared with the cover members of Comparative Examples.

[Cover Member Including First Substrate Layer, Second Substrate Layer, and Tab Film]

Example 3

<Preparation of Second Substrate Layer>

Prepared was a laminate of a double-sided adhesive tape C and a PET film B (LUMIRROR #50S10, having a thickness of 50 μm and being non-foam, manufactured by Toray Industries, Inc.). Next, the laminate was punched into a frame shape having an outer shape of 11 mm×10 mm and an inner shape of 6.8 mm×3.8 mm. A second substrate layer A was thus obtained.

<Production of Cover Member>

The first substrate layer A was joined to one of faces of the protective membrane A with the double-sided adhesive tape B of the first substrate layer A. Next, the second substrate layer A was joined to the other face of the protective membrane A with the double-sided adhesive tape C of the second substrate layer A. The joining of the second substrate layer A was performed such that the inner shapes of the first substrate layer A and the second substrate layer A, which are frame-shaped, coincide with each other when viewed perpendicularly to the principal surface of the protective membrane A. Next, the entire joined body was punched into a rectangle having an outer shape of 9 mm×6 mm. A cover member was thus obtained. The punching was performed such that the centers of the inner shapes of the first substrate layer A and the second substrate layer A coincide with the center of the entire joined body after the punching. Next, the cover member was placed on a member supply sheet with the double-sided adhesive tape A of the first substrate layer A interposed therebetween. In this state, among the substrate films included in the first substrate layer A, the foam film, which is the substrate of the double-sided adhesive tape A, was positioned farthest from the protective membrane A and closest to the member supply sheet.

Example 4

A cover member was obtained in a similar manner to that of Example 3, except that the second substrate layer B was used instead of the second substrate layer A. The second substrate layer B used was a laminate of the double-sided adhesive tape B and the PET film B. The second substrate layer B was joined to the protective membrane A with the double-sided adhesive tape B of the second substrate layer B. The cover member was placed on a member supply sheet with the double-sided adhesive tape A of the first substrate layer A interposed therebetween. In this state, among the substrate films included in the first substrate layer A, the foam film, which is the substrate of the double-sided adhesive tape A, was positioned farthest from the protective membrane A and closest to the member supply sheet.

Example 5

A cover member was obtained in a similar manner to that of Example 4, except that a first substrate layer D was used instead of the first substrate layer A. The first substrate layer D prepared was a laminate of a double-sided adhesive tape D (No. 57115B, having a thickness of 150 μm, manufactured by Nitto Denko Corporation), the PET film A, and the double-sided adhesive tape B (the layers were disposed in this order). The substrate of the double-sided adhesive tape D was a polyethylene foam film (having a thickness of 80 μm). The first substrate layer D included, as substrate films, two non-foam films and one foam film. An adhesive of the double-sided adhesive tape D was acrylic. The first substrate layer D was joined to the protective membrane A with the double-sided adhesive tape B of the first substrate layer D. The cover member was placed on a member supply sheet with the double-sided adhesive tape D of the first substrate layer D interposed therebetween. In this state, among the substrate films included in the first substrate layer D, the foam film, which is the substrate of the double-sided adhesive tape D, was positioned farthest from the protective membrane A and closest to the member supply sheet.

Example 6

A cover member was obtained in a similar manner to that of Example 4, except that a first substrate layer E was used instead of the first substrate layer A. The first substrate layer E prepared was a laminate of a double-sided adhesive tape E (No. 57120B, having a thickness of 200 μm, manufactured by Nitto Denko Corporation), the PET film A, and the double-sided adhesive tape B (the layers were disposed in this order). The substrate of the double-sided adhesive tape E was a polyethylene foam film (having a thickness of 100 μm). The first substrate layer E included, as substrate films, two non-foam films and one foam film. An adhesive of the double-sided adhesive tape E was acrylic. The first substrate layer E was joined to the protective membrane A with the double-sided adhesive tape B of the first substrate layer E. The cover member was placed on a member supply sheet with the double-sided adhesive tape E of the first substrate layer E interposed therebetween. In this state, among the substrate films included in the first substrate layer E, the foam film, which is the substrate of the double-sided adhesive tape E, was positioned farthest from the protective membrane A and closest to the member supply sheet.

Example 7

A cover member was obtained in a similar manner to that of Example 4, except that a first substrate layer F was used instead of the first substrate layer A. The first substrate layer F prepared was a laminate of the double-sided adhesive tape A and the double-sided adhesive tape B. The first substrate layer F included, as substrate films, one non-foam film and one foam film. The first substrate layer F was joined to the protective membrane A with the double-sided adhesive tape B of the first substrate layer F. The cover member was placed on a member supply sheet with the double-sided adhesive tape A of the first substrate layer F interposed therebetween. In this state, among the substrate films included in the first substrate layer F, the foam film, which is the substrate of the double-sided adhesive tape A, was positioned farthest from the protective membrane A and closest to the member supply sheet.

Comparative Example 4

A cover member was obtained in a similar manner to that of Example 3, except that the first substrate layer B was used instead of the first substrate layer A. The cover member was placed on a member supply sheet with the double-sided adhesive tape C of the first substrate layer B interposed therebetween.

Comparative Example 5

A cover member was obtained in a similar manner to that of Example 3, except that the first substrate layer C was used instead of the first substrate layer A. The cover member was placed on a member supply sheet with the double-sided adhesive tape A of the first substrate layer B interposed therebetween.

Tables 3 and 4 show the structures of the first substrate layer and the second substrate layer, respectively. Table 5 shows the structures and evaluation results of Examples 3 to 7 and Comparative Examples 4 and 5. "Foam" and "Non-foam" in Table 3 indicate, as the substrate of the double-sided adhesive tape, a foam film and a non-foam film, respectively.

TABLE 3

| First substrate layer A | (Protective membrane side) Double-faced adhesive tape B (non-foam)/ PET film A (non-foam)/ Double-faced adhesive tape A (foam) (Member supply sheet side) |
|---|---|
| First substrate layer B | Double-faced adhesive tape C (non-foam) |
| First substrate layer C | Double-faced adhesive tape A (foam) |
| First substrate layer D | (Protective membrane side) Double-faced adhesive tape B (non-foam)/ PET film A (non-foam)/ Double-faced adhesive tape D (foam) (Member supply sheet side) |
| First substrate layer E | (Protective membrane side) Double-faced adhesive tape B (non-foam)/ PET film A (non-foam)/ Double-faced adhesive tape E (foam) (Member supply sheet side) |
| First substrate layer F | (Protective membrane side) Double-faced adhesive tape B (non-foam)/ Double-faced adhesive tape A (foam) (Member supply sheet side) |

TABLE 4

| Second substrate layer A | PET film B/Double-faced adhesive tape C |
|---|---|
| Second substrate layer B | PET film B/Double-faced adhesive tape B |

TABLE 5

|  | Example 3 | Example 4 | Example 5 | Example 6 | Example 7 | Comparative Example 4 | Comparative Example 5 |
|---|---|---|---|---|---|---|---|
| Second substrate layer | A | B | B | B | B | A | A |
| Protective membrane |  |  |  | A |  |  |  |
| First substrate layer | A | A | D | E | F | B | C |
| Peel force[1] (N/30 mm) | 0.5 |  | 0.6 | 0.7 |  | 0.5 |  |
| Peelability[2] | Excellent | Excellent | Excellent | Excellent | Excellent | Unacceptable | Poor |
| Damage[3] | No | No | No | No | No | Evaluation impossible | Yes |

[1] Peel force indicates peel force between first substrate layer and member supply sheet
[2] Peelability indicates peelability of cover member from member supply sheet
[3] Damage indicates whether protective membrane was damaged at peeling-off of tab film As shown in Table 5, the cover members of Examples, each of which included the first substrate layer including the non-foam film and the foam film, were excellent in peelability, compared with the cover members of Comparative Examples. Also, in the cover member of Comparative Example 5, which included the first substrate layer including only the foam film, the protective membrane was damaged at peeling-off of the tab film. It is presumed that this is because the first substrate layer, which was excessively flexible, increased deformation of the protective membrane at peeling-off of the tab film thus to cause a cohesive failure. Note that, with respect to the cover member of Comparative Example 4, the protective membrane was damaged at peeling-off from the member supply sheet, and accordingly it was impossible to evaluate whether the protective membrane was damaged at peeling-off of the tab film.

INDUSTRIAL APPLICABILITY

The cover member of the present invention can be used for similar applications to those of conventional cover members including a protective membrane.

The invention claimed is:

1. A cover member to be placed on a face of an object to prevent passage of a foreign matter through an opening of the face, the cover member comprising:
   a protective membrane having a shape configured to cover the opening when the cover member is placed on the face; and
   a first substrate layer joined to one of principal surfaces of the protective membrane, wherein
   the first substrate layer has a laminated structure including two non-foam films and a foam film, and is positioned between the protective membrane and the face when the cover member is placed on the face, and
   wherein the foam film is positioned farther from the protective membrane than each of the two non-foam films.

2. The cover member according to claim 1, wherein the foam film is a substrate film.

3. The cover member according to claim 1, wherein the protective membrane has air permeability in a thickness direction.

4. The cover member according to claim 1, wherein the protective membrane includes a stretched porous polytetrafluoroethylene membrane.

5. The cover member according to claim 1, wherein the protective membrane has a cohesive force of 2.0 N/20 mm or less.

6. The cover member according to claim 1, wherein the first substrate layer has an outer periphery coinciding with an outer periphery of the protective membrane when viewed perpendicularly to the principal surface of the protective membrane.

7. The cover member according to claim 1, further comprising
a second substrate layer including at least one substrate film, wherein
the second substrate layer is joined to the other principal surface of the protective membrane such that the second substrate layer and the first substrate layer sandwich the protective membrane therebetween.

8. The cover member according to claim 7, wherein
the second substrate layer includes, as the substrate film, only a non-foam film.

9. The cover member according to claim 7, wherein
a substrate film included in the first substrate layer and positioned closest to the protective membrane has the same structure as the substrate film included in the second substrate layer and positioned closest to the protective membrane, and
wherein the substrate film included in the first substrate layer is one of the two non-foam films.

10. The cover member according to claim 7, wherein
the second substrate layer has an outer periphery coinciding with an outer periphery of the protective membrane as viewed perpendicularly to the principal surface of the protective membrane.

11. The cover member according to claim 1, further comprising
a tab film placed on an outermost layer of the cover member, the outermost layer being positioned farthest from the face when the cover member is placed on the face, wherein
the tab film has a portion protruding outward more than an outer periphery of the outermost layer when viewed perpendicularly to a principal surface of the outermost layer.

12. A member supply assembly comprising:
a member supply sheet; and
a cover member placed on the member supply sheet, wherein
the cover member is the cover member according to claim 1, and
the first substrate layer of the cover member faces the member supply sheet.

13. The member supply assembly according to claim 12, being band-shaped and wound to form a wound body.

* * * * *